US007783436B2

(12) United States Patent
Sadri et al.

(10) Patent No.: US 7,783,436 B2
(45) Date of Patent: Aug. 24, 2010

(54) SYSTEM AND METHOD FOR THE ACOUSTIC MONITORING OF TAPBLOCKS AND SIMILAR ELEMENTS

(75) Inventors: Afshin Sadri, Woodbridge (CA); Pawel B. Gebski, Mississauga (CA); Bert O. Wasmund, Mississauga (CA); Nils W. Voermann, Mississauga (CA)

(73) Assignee: Hatch Ltd., Mississauga, ON (CA)

( * ) Notice: Subject to any disclaimer, the term of this patent is extended or adjusted under 35 U.S.C. 154(b) by 89 days.

(21) Appl. No.: 12/240,215

(22) Filed: Sep. 29, 2008

(65) Prior Publication Data

US 2009/0093978 A1 Apr. 9, 2009

Related U.S. Application Data

(60) Provisional application No. 60/976,218, filed on Sep. 28, 2007.

(51) Int. Cl.
*G06F 19/00* (2006.01)
*G01H 17/00* (2006.01)

(52) U.S. Cl. ........................................ 702/56; 73/570

(58) Field of Classification Search .................. 702/54, 702/56; 73/587, 627, 570
See application file for complete search history.

(56) References Cited

U.S. PATENT DOCUMENTS

| | | | | |
|---|---|---|---|---|
| 3,855,847 | A * | 12/1974 | Leschek | 73/587 |
| 5,351,655 | A | 10/1994 | Nuspl | |
| 5,557,631 | A | 9/1996 | Bulat et al. | |
| 7,174,787 | B2 | 2/2007 | Sadri et al. | |
| 2006/0186585 | A1 | 8/2006 | Sadri et al. | |

OTHER PUBLICATIONS

International Search Report regarding PCT/CA2008/001726, International Filing Date: Sep. 28, 2009, Mailing Date of the ISR: Jan. 16, 2009.

* cited by examiner

*Primary Examiner*—Bryan Bui
(74) *Attorney, Agent, or Firm*—Bereskin and Parr LLP, S.E.N.C.R.L., s.r.l.

(57) ABSTRACT

Some metallurgical furnaces have a tapblock that is blocked during operation of the furnace. The tapblock may be opened by lancing, drilling, tapping or by other methods to release metal from the furnace. By monitoring acoustic emissions during the opening process, feedback may be provided to improve the opening process and to avoid excessive damage to the tapblock, the cooling elements, a refractory lining of the tapblock or other elements of the metallurgical furnace.

35 Claims, 7 Drawing Sheets

SYSTEM AND METHOD FOR THE ACOUSTIC MONITORING OF TAPBLOCKS AND SIMILAR ELEMENTS

CROSS-REFERENCE TO PRIOR APPLICATIONS

This application claims the benefit of U.S. provisional patent application No. 60/976,218, which is incorporated herein by this reference.

TECHNICAL FIELD

The described embodiments relate generally to diagnostic systems and methods for metallurgical furnaces. In particular, embodiments relate to systems and methods for real-time acoustic monitoring of events occurring during the tapping and lancing of the tapping channel of a tapblock or similar element.

BACKGROUND

Most metallurgical furnaces have at least one tapblock for the purpose of draining molten process material from the furnace. The process of draining molten process material from a metallurgical furnace via a tapblock is called tapping.

Tapblocks typically have a copper shell, cooling elements, refractory material and a tapping channel. The copper shell defines a hot face, which is the face of the tapblock that is positioned most closely to the molten process material inside the furnace, and a cold face, which is opposite the hot face. Because of the extreme heat of the molten process material contained within the furnace, the tapblock has one or more cooling elements to regulate the temperature of the inner refractory lining, tapping channel and the copper shell. The cooling elements are typically pipes adjacent to or surrounding the tapblock. A cooling fluid is pumped through the pipes.

Passing through the centre of the tapblock, and connecting the hot face and the cold face, is the tapping channel. The tapping channel is surrounded by one or more layers of refractory lining. The tapping channel is generally circular passage through which the molten process material flows during the tapping process. The cooling elements of the tapblock serve to extract heat from the refractory lining and the tapping channel.

When tapping is not in progress, the tapping channel is commonly plugged using heat resistant clay, or other suitable material. The clay plug remains in the tapping channel until tapping is required. When tapping becomes necessary, the clay plug must be removed from the tapping channel. In order to remove the clay plug, it is broken and removed in pieces using a tool called a thermal lance. A worker, referred to herein as a tapper, manually operates the lance and strikes the clay plug in an attempt to break the plug apart and to allow the molten process material to flow through the tapping channel. The tapper generally strikes the clay plug multiple times in an attempt to fully clear the tapping channel. In addition to tapping and lancing, in some processes, drilling is used to open the tapping channel.

During the lancing process, the tapper may inadvertently strike some of the refractory material lining the tapping channel along with the clay plug. Strikes from the lance can damage the refractory lining of the tapblock. In addition, the flow of molten metal through the tapping channel can gradually erode the refractory lining of the tapping channel leading to tapblock damage. Damaged tapblocks can present safety hazards and can lead to costly production downtime when they need to be replaced.

Therefore, there is a need for a system to monitor the tapping process, drilling process, and specifically the lancing process, and provide feedback in order to minimize damage to the tapblock or the refractory lining.

SUMMARY

Several systems for monitoring a tapblock or a similar element are described.

Some embodiments comprise a plurality of acoustic emission sensors positioned to sense acoustic signals transmitted along at least one acoustic waveguide that is at least partially received within the outer structure of the tapblock.

Some embodiments further comprise a data processing system for processing the output from each of the acoustic emission sensors to determine the occurrence of an acoustic event in relation to the inner structure of the tapblock, particularly the refractory lining. The data processing system comprising a memory and being configured to compare the determined events with operational parameters of the tapblock to generate indication data depending on the comparison of the determined events with the operational parameters.

Some embodiments also comprise an indication apparatus responsive to the data processing system for providing an indication based on the indication data.

There is also provided a method of monitoring a tapblock or similar element. The method comprising receiving electrical signals from a plurality of acoustic emission sensors along at least one acoustic waveguide that is at least partially received within an outer structure of a tapblock. The electrical signals correspond to acoustic signals being transmitted along the acoustic waveguide and sensed by the acoustic emission sensors. The electrical signals are processed to determine the occurrence of events in relation to an inner structure of the tapblock, particularly the refractory lining. The events are compared with the operational parameters of the tapblock. Indication data is generated, depending on the comparison, and an indication is provided based on the indication data.

BRIEF DESCRIPTION OF THE DRAWINGS

For a better understanding of the embodiments described herein and to show more clearly how they may be carried into effect, reference will now be made, by way of example only, to the accompanying drawings in which.

Figure 1:
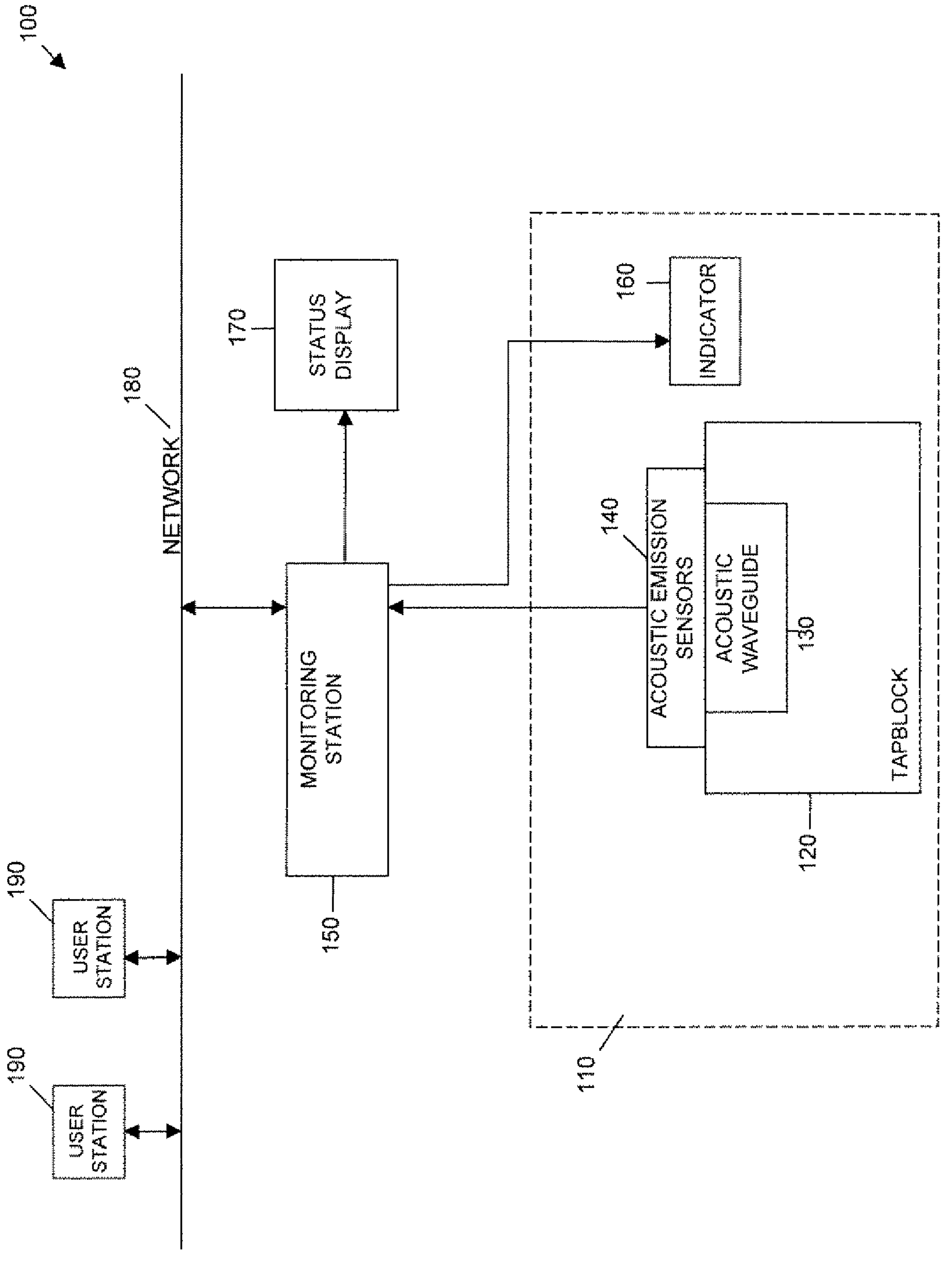
FIG. 1 is a block diagram of an acoustic monitoring system for a tapblock of a metallurgical furnace, according to one embodiment of the invention.

For simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

Specific details of the embodiments are set forth, by way of example, in order to provide a thorough understanding of the embodiments described herein. Furthermore, this description is not to be considered as limiting the scope of the embodiments described herein in any way, but rather as merely describing possible implementations of the various embodiments described herein.

The described embodiments relate generally to diagnostic systems and methods for metallurgical furnace cooling elements such as tapblocks. In particular, embodiments relate to systems and methods for real-time acoustic monitoring of the tapping, drilling and lancing of tapblocks and similar conduits.

In the drawings and in the description, like reference numerals are used to indicate like elements, functions or features as between the drawings and the described embodiments.

Referring now to FIG. 1, there is shown a real-time acoustic monitoring system 100 for monitoring a tapblock 120 used in relation to a metallurgical furnace 110. The metallurgical furnace 110 may be any known type of furnace that comprises a tapblock 120. Examples of such metallurgical furnaces 110 include induction furnaces, electric arc furnaces, flash furnaces, blast furnaces, chemical chlorinators, or any pyrometallurgical metal smelting furnace.

The tapblock 120 may be of any configuration known to those skilled in the art. For the illustrative purposes, the tapblock 120 should be understood to be of a general design such that it comprises a copper shell, cooling circuits, a taphole and a refractory lining. The tapblock 120 is described in more detail below in the discussion relating to FIG. 4.

In the acoustic monitoring system 100, the tapblock includes an acoustic waveguide 130. The term "waveguide" is used in this context to mean a physical structure that enables the propagation of waves within the structure. In particular, an acoustic waveguide 130 is a physical structure for enabling the propagation of sound or ultrasound waves within or along the structure. In other words, an acoustic waveguide 130 is an apparatus for directing sound propagation from a source to a desired location. An acoustic waveguide 130 can also be described as a sound or ultrasound wave transmission line. Any acoustic signal that contacts the acoustic waveguide 130 propagates along the entire length of the acoustic waveguide 130.

The behavior of sound and ultrasound waves carried by the acoustic waveguide 130 is dependent on the elastic wave speed of the waveguide. The elastic wave speed is considered a constant material property of the acoustic waveguide 130. The process of determining the elastic wave speed of the material of a given acoustic waveguide 130 is known to those skilled in the art. For example, one process for determining the elastic wave speed of a given material is to place two sensors on a medium, such as the cooling circuit, separated by a known distance, and transmit an elastic wave through them. The time delay between arrival of the first wave to each sensor is used to measure the stress wave speed for the medium or in this case the cooling circuit In the acoustic monitoring system 100, the acoustic waveguide 130 can be formed from any material with the desired mechanical properties (melting temperature, corrosion resistance, etc.). The acoustic waveguide 130 may be a separate component installed within the tapblock 120 for the sole purpose of serving as an acoustic waveguide 130 or, the function of an acoustic waveguide 130 may be achieved by existing tapblock 120 components that pass through the shell of the tapblock 120, such as the cooling circuits. In the embodiment of the acoustic monitoring system 100, the purpose of the acoustic waveguide 130 is to transmit acoustic signals from the interior of the tapblock 120 to exterior locations where the acoustic signals can be received by the acoustic emissions sensors 140. Depending on the configuration of the tapblock 120 used and the acoustic measurements desired, the acoustic monitoring system 100 may comprise one or more acoustic waveguides 130.

In some embodiments, the cooling circuit may be used as the waveguide medium. In such embodiments, acoustic emission (AE) sensors are attached to the inlet and outlet of each cooling circuit. The cooling circuit extends along the tapping channel and the inner refractory lining. To determine the wave speed for the refractory lining the temperature effects on the refractory stress wave speed may be taken into consideration. As the refractory material erodes away, the physical sources of the acoustic signals related to the refractory erosion become closer to the waveguides, hence the amplitude of the signals increases. The time delay between the source and the receiver decreases as the refractory material erodes away and the distance between the source and the waveguide decreases. The source of stress wave energy is the motion of the molten metal through the tapping channel or the refractory erosion caused by the thermal or mechanical influence of the molten metal. The sound (and ultrasound) is generated as the molten metal moves from internal furnace chamber to outside lauders.

The acoustic monitoring system 100 may be configured to detect acoustic emissions from a variety of sources. In a tapblock 120, the expected sources of acoustic emissions may comprise lancing, tapping and capping (the re-sealing of the tapping channel) activities, noise related to the refractory lining as the hot metal passes through (expansion), noise related to the refractory lining as the taphole is capped and the refractory is cooled (shrinkage), noise related to the drilling of tapping clay and the surrounding refractory lining, refractory lining deterioration, copper deterioration, molten metal flow, water flow in the cooling circuits and water boiling in the cooling circuits near damaged sections of the tapblock.

In some embodiments of the acoustic monitoring system 100, the acoustic emissions sensors 140 may be attached to the acoustic waveguide 130. The acoustic emissions sensors 140 serve as transducers to convert the acoustic signals carried by the acoustic waveguide 130 into corresponding electrical signals that can be processed by the monitoring station 140. For example, acoustic signals generated within the tapblock 120 may be transmitted, by way of pressure wave or vibration, to the acoustic waveguide 130 for transmission to the exterior of the tapblock 120. Acoustic emissions sensors 140, attached to the acoustic waveguide 130 may translate the vibrations of the acoustic waveguide 130 into corresponding electrical impulses, that are then transmitted to the monitoring station 150.

The acoustic emissions sensors 140 may be any known type of transducer that is capable of converting acoustic energy or vibrational energy into a corresponding electrical signal. One example of such a transducer is an accelerometer. An accelerometer used within the acoustic monitoring system 100 may be of any appropriate type known to those skilled in the art. For example, the accelerometer may be a piezoelectric sensor, an optical sensor, capacitive spring mass based, an electromechanical servo, strain gauge based or magnetic induction based. It is understood that a user skilled in the art can select an appropriate accelerometer for the specific conditions surrounding a given tapblock 120 and metallurgical furnace 110. The acoustic monitoring system 100, may comprise multiple acoustic emissions sensors 140 attached to separate locations along each acoustic waveguide 130 received within the tapblock 120.

Figure 2:
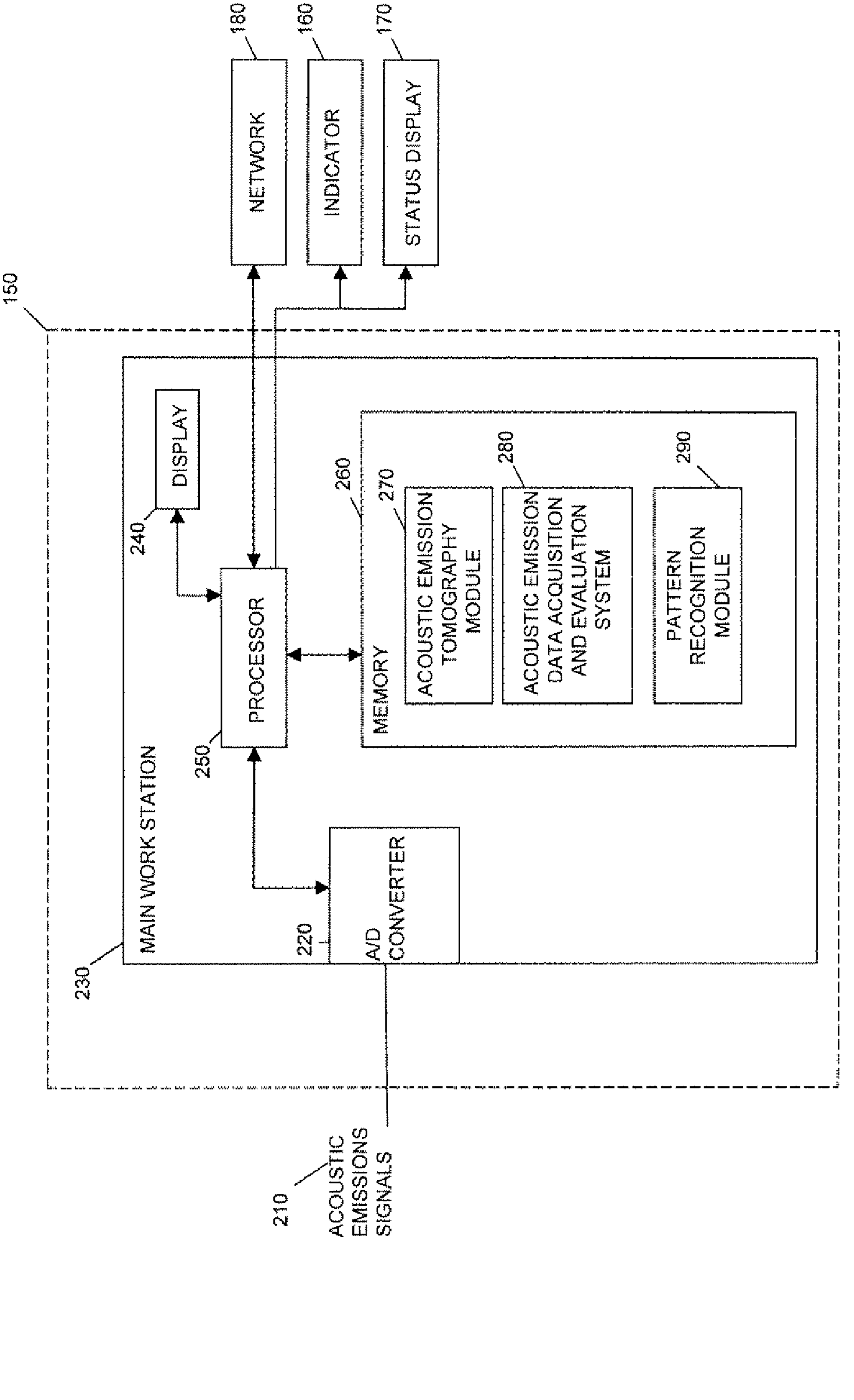
FIG. 2 is a block diagram of one embodiment of a monitoring station used in the acoustic monitoring system of FIG. 1.

Electrical signals produced by the acoustic emissions sensors 140 are received by the monitoring station 150 for processing. Transmission of the signals from the acoustic emissions sensors 140 to the monitoring station 150 may be done using SMA-BNC cables to connect the acoustic emissions sensors 140 to a preamplifier (not shown). Coaxial cables may then be used to connect the preamplifiers to a data acquisition module, such as a microDiSP (not shown), or to the A/D converter 220 (as shown in FIG. 2). The transmission of the signals may be accomplished using any other suitable cables or transmission means that can operate in the environment surrounding a metallurgical furnace. The transmission cables and preamplifiers may be insulated in order to protect them from the heat of the furnace. It may also be desirable to use acoustic emissions sensors 140 that comprise internal signal amplifiers in order to reduce or eliminate the need for separate preamplifiers. Reducing the number of preamplifiers necessary may minimize the number of potentially vulnerable components exposed to the heat of the furnace.

The acquisition and processing of the acoustic signal data may be performed using a variety of methods or commercially available systems known to those skilled in the art. Examples of such an acoustic signal acquisition and processing system are produced by Physical Acoustics Corporation, of New Jersey, U.S.A, and by Vallen-Systeme GmbH of Germany. In the embodiment of the acoustic monitoring system 100, the monitoring station 150 may be a personal computer (PC), a server based processing system or any other comparable system.

Examples of acoustic emission monitoring techniques can include the measurement of acoustic activity and intensity within the acoustic waveguide 130. The principle behind the acoustic monitoring system 100 is that there is a physical source behind every acoustic signal, and that the part of the energy that is released by the source that is converted to high frequency vibrations is detected as an acoustic emission. Acoustic signals may also be compared using pattern recognition techniques in order to classify the acoustic signal as originating from a given source.

For example, when the acoustic monitoring system 100 is configured to monitor the condition of the refractory lining it may detect signals that are related to the flow of the molten metal through the tapping channel. The signals are generated on the interface between the molten metal and the refractory lining, and the signal propagation is caused by the motion of the molten metal and by the resulting thermal expansion of the refractory or wearing and deterioration of the inner refractory lining. In order for the acoustic emissions to be detected by the acoustic monitoring system 100, the acoustic emissions must propagate through the refractory lining and the copper shell of the tapblock until they reach the acoustic waveguide 130 (for example a Monel cooling pipe).

As an acoustic emission propagates through the refractory lining and the copper shell of the tapblock 120, it may undergo significant signal attenuation. The degree of attenuation may be related to the thickness of refractory and copper shell material that the acoustic emission passed through before contacting the acoustic waveguide 130. In general, the thinner the refractory lining or copper shell, the less attenuation of the acoustic emission. Therefore, if a given acoustic emission becomes stronger it may indicate a reduction in the amount of refractory and copper material that the acoustic emission passed through. A reduction in the amount of refractory or copper material may signify wear or damage of the tapping channel. In general, signal attenuation is a function of the material properties of the tapblock 120 components. The degree of signal attenuation through any given tapblock 120 component may be a function of Young's modulus, Poisson's ratio and density.

If desired, source location for a specific acoustic signal can be determined based on arrival time of the signals received from multiple acoustic emissions sensor 140 locations. For example, when using two acoustic emissions sensors 140, installed on opposite ends of an acoustic waveguide 130, the source location of a given acoustic signal can be determined based on i) the difference in the arrival times of the acoustic signal at each acoustic emissions sensor 140 and ii) the elastic wave speed of the acoustic waveguide 130. The location information may be output or stored by the monitoring station 150 as a unique location, or alternatively, the location information may be compared to a plurality of pre-determined zone locations that correspond to specified regions of the tapblock 120. Therefore, the location information output by the monitoring station 150 can be in the form of a distance along the acoustic waveguide 130 (ie the source is 3 meters from the acoustic emissions sensor 140) and, the source information can be output in the form of a zone indication that corresponds to a portion of the tapblock 120 (ie the source is the left wall of the tapping channel). A more detailed description of the signal processing techniques described above is contained below, with reference to FIGS. 2 and 3.

The monitoring station 150 may also utilize the acoustic signal data to determine if an acoustic event has occurred. The criteria and thresholds used to determine whether an acoustic event has occurred can be any pre-determined conditions set by a system operator. For example, an acoustic event may be a discrete, short duration event (a high-impact strike to the refractory lining by the tapping lance), it may be a threshold value alarm for a relatively steady acoustic signal (an increase in amplitude of the acoustic emissions caused by liquid metal flowing through the taphole) or it may be an accumulation of, or combination of, multiple acoustic signals (multiple low-impact lance strikes may cumulatively trigger an acoustic event). Much like the location information for an individual acoustic signal, the location of a given acoustic event can be output as a discrete location along the acoustic waveguide 130 or mapped onto a corresponding, pre-determined zone location.

Having performed the necessary acoustic signal acquisition and processing, the monitoring station 150 may provide an output to the indicator 160 and the status display 170.

The indicator 160 provides a highly visible display positioned in proximity to metallurgical furnace 110 to provide real-time feedback to employees and operators working in proximity to the furnace 110. Specifically, the indicator 160 may provide visual feedback to an operator during the lancing, tapping or drilling process. The indicator 160 may be mounted directly on a wall of the metallurgical furnace 110, or alternatively it may mounted in a separate location that is visible from the metallurgical furnace 110 and the tapblock 120. The indicator 160 can be configured to display feedback to a tapper in real-time. The real-time feedback allows a tapper to modify the tapper's actions in order to avoid unnecessary damage to the tapblock 120 and the refractory lining therein.

The indicator 160 may be configured to indicate an "OK" state, a "Caution" state and a "Stop/Danger" state. These states may be respectively indicated by green, yellow and red lights on the indicator 160 so as to resemble common traffic signals. The indicator 160 may also comprise several sets of indication lights that correspond to the state of each predefined zone within the tapblock 120. For clarity, an example illustrating possible indication outputs resulting from an acoustic event is outlined below Consider a tapper whose lance strikes the left wall of the taphole 125 (FIG. 4) of tapblock 120, causing an acoustic event. If the indicator 160 comprises a single set of indication lights, the indicator may flash a yellow light, alerting the tapper that an improper strike has occurred. If, however, the indicator comprises one set of indicator lights for each predefined zone of a tapblock 120, the indicator may flash a yellow light within the set of indicator lights that corresponds to the left wall of the taphole 126. The second scenario is preferable because it provides the tapper with more precise and useful information. Having seen the yellow light that corresponds to the left wall of the taphole 126, the tapper can shift the next lance strike to the right in order to avoid striking the wall.

Although the indicator 160 is described as displaying a simple arrangement of colored lights, it is understood that the indicator 160 could be configured to display any combination of visual information (eg. lights, text, images, photographs, animations, etc) and audio information (eg. horns, buzzers, sirens, music, pre-recorded dialogue, recorded warning messages, etc.).

In addition to the indicator 160, information from the monitoring station 150 can be sent to a status display 170. The status display 170 may display the same information displayed by the indicator 160, or it may a different set of information. In addition, the status display 170 may be physically located in close proximity to the metallurgical furnace 110, or alternatively the status display 170 may be located in a remote location, such as a control room or supervisor's office. The status display 170 may take the same form as the indicator 160 (i.e. the status display 170 may also be a collection of colored lights) or it may be of a different form. For example, the status display 170 may comprise a computer monitor, an analogue meter, a digital display, an auditory alarm, a television monitor or any other appropriate display apparatus. While the embodiment of the acoustic monitoring system 100 is shown comprising both an indicator 160 and a status display 170, it is understood that the acoustic monitoring system 100 could be configured to operate without the indicator 160 and/or the status display or that the functions of both the indicator 160 and the status display 170 could be combined into a single element.

The monitoring station 150 may also be connected to a network 180 such that it is in communication with user stations 190. The network 180 can be an open or a closed network and it can be a wired or wireless network. The user stations 190 connected to the network may be PCs or any similar device. Once connected to the network 180, output information from the monitoring station 150 may be accessed from, or stored in, user stations 190 that can be in remote locations. The information displayed on the user stations 190 may be the same information displayed by the indicator 160 and the status display 170, or the user stations 190 may be configured to display a different set of information. In addition to displaying the real-time information output by the monitoring station 1501 the user stations 190 may also be configured to access any stored signal data or acoustic event information contained within the monitoring station 150. Having access to stored data enables an operator working at a user station 190 to compare real-time acoustic emissions data to previously recorded acoustic emissions data. Such a comparison allows an operator to trend the acoustic emissions information over an extended period of time thereby enabling an operator to track changes in the acoustic emissions of a given tapblock 120, or to track and evaluate the performance of a given tapper.

FIG. 2 shows a block diagram illustration of an embodiment of the monitoring station 150, as shown in FIG. 1. The embodiment of the monitoring station 150 includes a main workstation 230. The main workstation 230 comprises computer software modules 270, 280 and 290 stored in a memory 260 and executed on a processor 250. The processor 250 may be any commercially available processor known to those skilled in the art. Similarly, the memory 260 may be any type of commercially available volatile or non-volatile computer memory. It is understood by those skilled in the art that the main workstation 230 may include additional memory, software modules and processors as necessary.

The processor 250 may also be in communication with the network 180, the indicator 160 and status display 170. Communication with the network 180 enables that processor 250 to output acoustic signal and acoustic event data for storage and analysis at remote locations, such as the user workstations 190 shown in FIG. 1. Communication with the network 190 may also allow the processor 250 to be remotely accessed and controlled such that changes in the configuration of the processor 250 and the main workstation 230 may be also affected from remote locations. Communication between the processor 250 and the indicator 160 and status display 170 allows for acoustic signal and acoustic event information to be output from the main workstation 230 and displayed to tappers and system operators.

The main workstation 230 also comprises an analogue-to-digital (A/D) converter and a display 240 that are in communication with the processor 250. The A/D converter 210 is configured to receive analogue acoustic emissions signals 210 produced by the acoustic emissions sensors 140 (see FIG. 1) and convert them into corresponding digital signals that are communicated to the processor 250. The A/D converter 250 can be any commercially available A/D converter known to those skilled in the art. Also, the A/D converter 250 may be single-channel for processing the acoustic emissions signal 210 from a single acoustic emissions sensor 140, or, the A/D converter 250 may be multi-channel for processing the acoustic emissions signals 210 from a plurality if acoustic emissions sensors 140. It is understood that if the A/D converter is single-channel, multiple A/D converters 250 may be included in the main workstation 230 such that there is one A/D converter 250 per acoustic emissions sensor 140 installed on the tapblock 120. In FIG. 2, the A/D converter 250 is shown as being received within the main workstation 230, however, it is understood that the A/D converter 250 may be integral to the acoustic emissions sensors 140 or it may be a self-contained device located remotely from, but communicably linked with, the main workstation 230.

The display 240 can be any type of commercially available data display apparatus, but for the purposes of explanation it should be understood to be a computer monitor. The display 240 may be used to display system information to an operator in a similar manner to the indicator 160 and status display 170, described above. In addition, the display 240 may be used in combination with an appropriate computer input device (e.g. a keyboard or mouse, not shown) to allow an operator to configure and modify the main workstation 230 directly, without having to connect via the network 180 as described above.

The monitoring station 150 may comprise only the main workstation 230 as described above, for example if the functionality of the monitoring station 150 can be achieved using a single, main workstation 230 PC. However, it is understood that the monitoring station 150 may also comprise additional PCs, servers, processors, displays and memory modules configured to be in communication with the main workstation 230.

Figure 3:
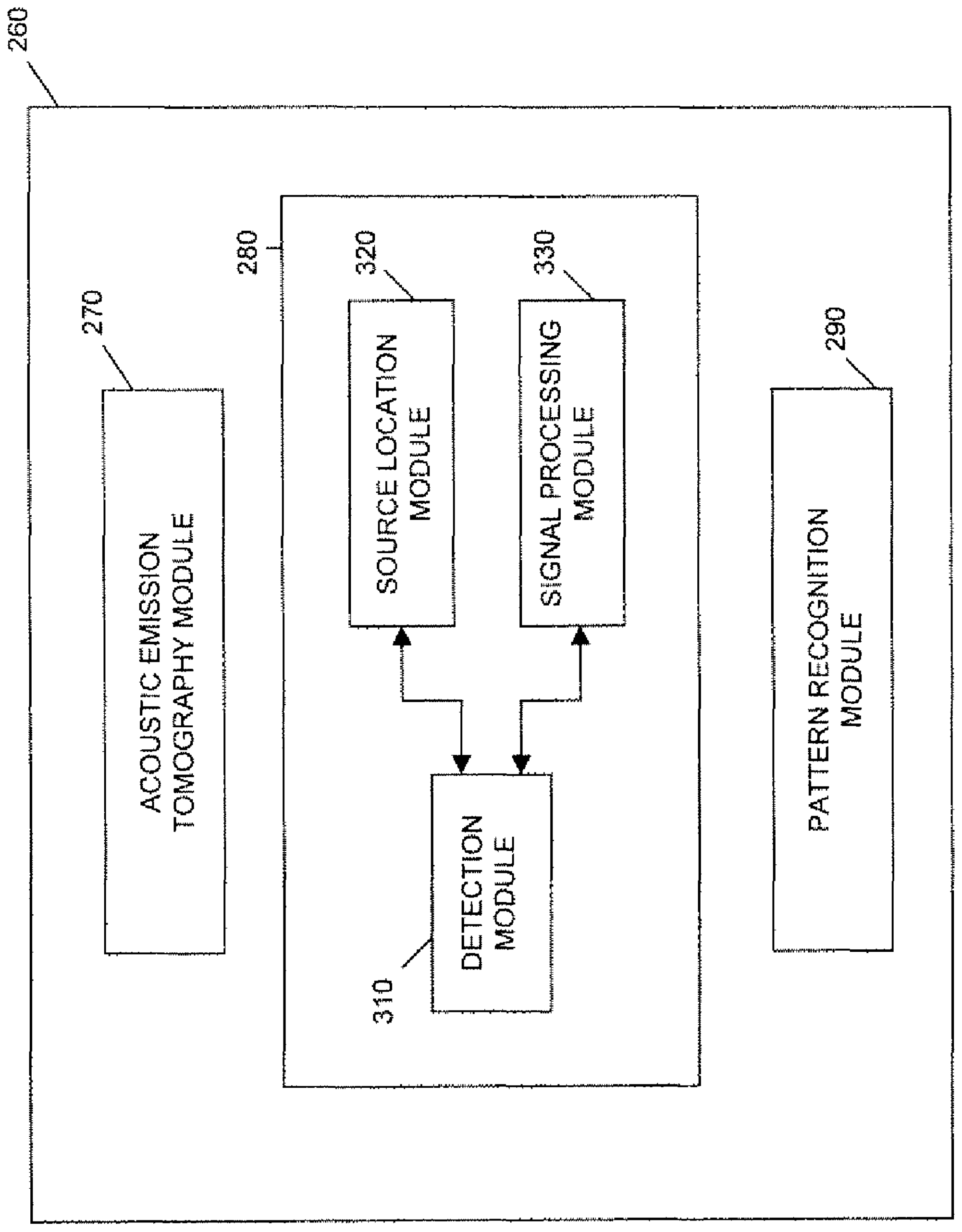
FIG. 3 is a block diagram showing the memory module of the monitoring station of FIG. 2 in greater detail.

As shown in FIGS. 2 and 3, the main workstation 230 memory 260 comprises a plurality of software modules 270, 280 and 290 for processing the acoustic emissions signals 210 received from the acoustic emissions sensors 140. Such software modules include the acoustic emission tomography module 270, the acoustic emission data acquisition and evaluation system 280 and the pattern recognition module 290. Although not shown, the memory 260 may also comprise additional software modules such as a database module for the storage and retrieval of acoustic emissions and acoustic event data.

Acoustic emission tomography module 270 is responsible for generating two-dimensional (2D) or three-dimensional (3D) images of the tapping channel, refractory lining, cooling circuits 410, 420 and other elements of the tapblock 120. During the operation of the tapblock 120 the acoustic monitoring system 100 may monitor acoustic emissions corresponding to refractory wear, copper shell deterioration, molten metal flow, water flow in the cooling circuits 410, 420 and water boiling within the cooling circuit near damaged sections of the tapblock 120. Using data collected by the acoustic emissions sensors 140 and results from the source location module 320 (described in detail below), the acoustic emission tomography module 270 creates 2D or 3D images that graphically illustrate the condition of the tapblock 120. For example, when monitoring refractory wear acoustic emissions, the acoustic tomography module 270 may create a 3D image that corresponds to the surface profile/geometry of the refractory lining. Images created by the acoustic tomography module 270 may show marks or depressions on the surface of the refractory lining or other wear patterns than can provide useful information for a skilled system operator viewing the image.

Rather than a complete 3D image of the tapping channel, the acoustic tomography module 270 may be configured to display a series of 2D cross-sectional images showing relative refractory thickness at a plurality of pre-determined cross-section locations along the length of the tapping channel. Similar images may also be created for a plurality of additional tapblock 120 features, such as the cooling circuits 410, 420 or the copper shell.

The pattern recognition module 290 is responsible for processing and classifying the acoustic emission signals 210 received from the acoustic emission sensors 140. Using the pattern recognition module 290, the acoustic signals generated during the tapping process can be identified and classified. One possible method of classification is separating acoustic emissions based on the physical source of the emission. For example, all acoustic emissions generated during the tapping process may be classified into four groups.

The first group of acoustic emissions may be caused by the liquid metal flowing through the taphole and tapping channel. Acoustic emissions of this type may be monitored to track and evaluate the condition of the refractory lining material. The second group of acoustic emissions may be caused by the mechanical impact of a lance striking the tapblock 120 or the refractory lining of the tapping channel during the lancing process. Tracking lance impact acoustic emissions can be used to evaluate the tapping process and track the performance of individual tappers. The third group of acoustic emissions are generated during the process of closing the taphole and the fourth group of acoustic emissions can be generated while the tapblock is cooling. The tracking and trending of all four groups of acoustic emissions can provide data that may be useful for process monitoring and improvement. Acoustic emission classification data may be output from the pattern recognition module 290 to the acoustic emission data acquisition and evaluation module 280 for further processing.

Acoustic emissions may be classified by the pattern recognition module 290 based on various signal properties. For example, one or more of the following signal properties may be used to classify a signal: peak amplitude, energy, duration, rise time, average frequency and rise time to duration ratio. Other factors, such as the timing of the acoustic emission during a particular part of the tapping process, the source location of the acoustic emission (what part of the tapping process is currently happening?) emission source location (obtained from the source location module 320 as described below), or any other acoustic emission characteristic selected by a system operator may be used to classify an acoustic emission. In some embodiments, a neural network is developed for pattern recognition and ultimately an image reconstruction of the tapping channel is generated. While the acoustic emission classification has been described in relation to analyzing the emissions with a pattern recognition module 290, it is also understood that equivalent or comparable processing could be done in real-time by the signal processing module 330 or by an alternate software module. Classified acoustic emissions can then be processed by the acoustic emission data acquisition and evaluation system module 280.

The acoustic emission data acquisition and evaluation system module 280 is responsible for receiving and processing acoustic signal information as well as detecting the presence of acoustic events and determining the source location of acoustic events. The acoustic emission data processed by the acoustic emission data acquisition and evaluation system module 280 may come directly from the A/D converter, from the acoustic emission tomography module 270, or from the pattern recognition module 290. As shown in FIG. 3, the acoustic emission data acquisition and evaluation system module 280 comprises a detection module 310, a source location module 320 and a signal processing module 330.

The detection module 310 is responsible for determining whether an acoustic event has occurred. The detection module 310 can receive acoustic emissions signals directly from the A/D converter 220 (via the processor 250), the pattern recognition module 290, or it can receive processed acoustic emissions signals from the signal processing module 330. Signals passing through the signal processing module 330 may filtered, amplified or otherwise modified as desired. The detection module 310 may also receive data from the pattern recognition module 290 as described above. Upon receiving an acoustic emission signal, the detection module 310 can compare the characteristics of the acoustic emission signal against a set of pre-determined thresholds or other alarm conditions. If the acoustic emission signal exceeds an associated threshold value or alarm condition, the detection module 310 may register an acoustic event. The detection module 310 may be configured with a plurality of threshold values or alarm conditions, including multiple thresholds associated with a given acoustic emission signal.

For example, the detection module 310 may have "Warning" and "Alarm" emission magnitude thresholds that are related to the acoustic emission signal corresponding to the liquid metal flowing over the refractory material inside the tapblock 120. If the magnitude of the acoustic emission signal reaches the "Warning" threshold value, the detection module 310 may register an acoustic event and output acoustic event data to the processor 250 wherein the data is routed to the yellow light on the indicator 160. If the magnitude of the acoustic emission increases such that it exceeds the "Alarm" threshold, the detection module 310 may register and output another acoustic event to the processor 250 thereby activating the red light on the indicator 160.

In addition, the detection module 310 may be configured to have threshold values associated with the acoustic emissions created by lancing or tapping impacts or drilling on the refractory material. The thresholds relating to lancing or tapping impacts or drilling may comprise emission magnitude thresholds (as described above in relation to the metal flow emissions) as well as occurrence thresholds. Lancing, tapping strike, or drilling magnitude thresholds may result in an acoustic event if an acoustic emission, classified as relating to lancing, tapping or drilling activities (either by the pattern recognition module 290 or the signal processing module 330), exceeds a pre-determined threshold value. An occurrence threshold may cause the detection module 310 to register an acoustic event if a pre-determined event occurs a given number of times.

For example, the detection module 310 may track lancing, tapping strike or drilling acoustic emissions and compare the acoustic emissions to both the magnitude and occurrence thresholds. If the lancing or tapping strike is deviated to an unwanted direction its acoustic emissions will indicate the deviation and the "Warning" or "Alarm" magnitude thresholds and an acoustic event may be registered by the detection module 310.

If a lancing, tapping strike or drilling acoustic emission does not exceed the magnitude thresholds, the detection module 310 may not register an acoustic event, but it may keep a record of each acoustic emission. Using an occurrence threshold, the detection module 310 may register a "Warning" acoustic event if it records five or more lancing, tapping strike or drilling acoustic emissions during a tapping session, regardless of whether they exceed the magnitude threshold. The detection module 310 may register an "Alert" acoustic event if it records 8 or more lancing, tapping strike or drilling during a tapping session, regardless of whether the acoustic emissions exceed the magnitude threshold. The occurrence thresholds contained within the detection module 310 may also incorporate information from the source location module 320, such that each zone within the tapblock 120 may have an independent occurrence threshold. Even if no single lancing, tapping strike or drilling acoustic emission was of sufficient magnitude to register a "Warning" event based on the magnitude thresholds, the refractory material of a tapblock 120 may be damaged by multiple, low-impact strikes and burning in the same location. By using occurrence thresholds, the detection module 310 can advantageously account for the cumulative effects of multiple, low-impact lancing, tapping strike or drilling. In other embodiments, there may any number of alerts in place of or in addition to the "Warning" and "Alert" levels and the thresholds for each type of alert may vary.

The values for both the magnitude and occurrence thresholds may be determined based on a variety of criteria including; age of the tapblock 120, condition of the refractory material in a given zone, historical performance of a given tapblock, historical acoustic emission levels, specific refractory material compositions, temperature of the tapblock, ambient noise conditions, type of acoustic emissions sensor 140 used or other factors. In setting the thresholds, various characteristics of the refractory material may be taken into account. As the thickness of the refractory material decreases, the signal amplitude of an acoustic emission increases and the signal decay time increases. These characteristics of the refractory lining may be used to set the magnitude and occurrence thresholds. As the refractory lining ages, the number of acoustic events may change. For example, as the refractory lining ages, cracks may develop in it, and various acoustic emissions may results from cracks in the linking or detachment of the lining from the shell or the tapblock. In some cases, an acoustic emission originating from a cracked refractory lining has an increased amplitude. The acoustic emission may be identified pattern recognition or the use of a neural network. All acoustic event data may be output from the detection module 310 to the processor 250 for processing and routing to the network 180, indicator 160 and status display 170.

For some types of acoustic events it may be desirable to identify the location of the source of the acoustic event. For example, if the acoustic event is as a result of lancing burn, it may be desirable to identify which portion of the tapblock 120 was burned for monitoring and inspection purposes. Similarly, if the acoustic event is an increase in the magnitude of a metal flow acoustic emission, it may be desirable to locate where within the tapping channel the metal flow emission is the highest. The source location module 320 is responsible for identifying the source of a given acoustic emission.

Figure 4:
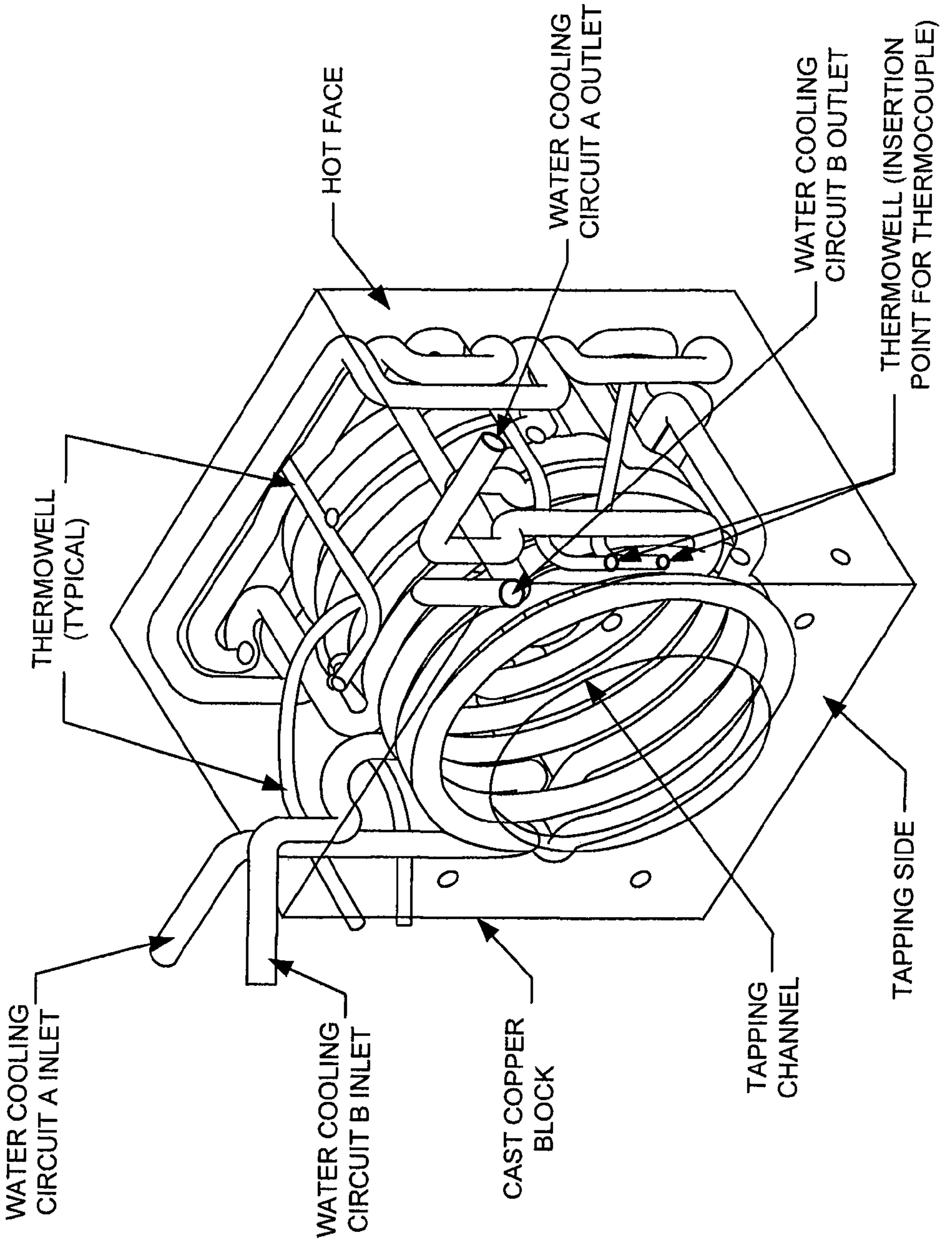
FIG. 4 is a perspective view of a tapblock of a metallurgical furnace.

For clarity of illustration, refer to FIG. 4 which shows a tapblock 120 that comprises a main cooling circuit 410, a secondary cooling circuit 420 and thermal wells 430. The cooling circuits 410, 420 and the thermal wells 430 have inlets 412, 422, 432 and outlets 414, 424, 434 respectively. The cooling circuits 410, 420 may comprise a plurality of appropriate components including conduits, pipes, tubes, valves, and pumps. One example of a primary cooling circuit 410 is a cooling conduit for carrying water that is configured to wind/twist through the interior of the tapblock 120. The cooling conduit may be cast-in or drilled-in to the tapblock 120. The specific path of the cooling circuits 410, 420 within the tapblock 120 can be determined based on the specific operating conditions of the tapblock 120. The thermal wells 430 and the cooling circuits 410, 420 may be made of any material with the desired physical characteristics, and may be a different material than the tapblock 120. The cooling medium carried through the cooling circuits 410, 420 may be water, or it may be any other suitable natural or synthetic cooling fluid.

The tapblock 120 also comprises a hot face 122 (defined as the face of the tapblock 120 positioned most closely to the interior of the metallurgical furnace 110), a cool face 124 (the face of the tapblock 120 located opposite the hot face 122) and a tapping channel 126 through which the molten metal flows during the tapping process. The inner surface of the tapping channel 126 is lined with refractory material.

To determine the source location for a given acoustic emission, the source location module 320 receives the acoustic emissions signals from at least two acoustic emissions sensors 140 mounted on a waveguide 130 that is received within the tapblock 120. As described above, the waveguide 130 may be an additional element received in the tapblock 120, or existing structural elements of the tapblock 120 shown in FIG., such as the cooling circuits 410 and 420 or thermal wells 430 may serve as the waveguide 130. For the purposes of describing an embodiment of the source location module 320, it will be assumed that cooling circuit 410 is acting as a waveguide 130 and that acoustic emission sensors 140 are mounted on the cooling circuit 410 inlet 410 and the outlet 414.

The source location of an acoustic emission is determined by the source location module 320 based on the elastic wave speed of the waveguide 130, the position of the acoustic emission sensors 140 and difference in the arrival time of the acoustic emission at each acoustic emission sensor 140 location. After an acoustic emission is picked up by the waveguide 130, the acoustic emission travels along the length of the waveguide 130 where it is detected by the acoustic emission sensors 140 located at substantially opposite ends of the waveguide 130. By comparing the relative arrival times of the acoustic emission at each acoustic emission sensor 140 location, the source location can be interpolated.

In the exemplary embodiment of the acoustic monitoring system 100, the acoustic emission may be caused by a high-impact tapping strike, thermal lancing device or drilling. The energy of the lancing is conducted from burning, the energy of tapping is by point of impact and drilling is by breaking and drilling of the solid, through the refractory material and the copper shell of the tapblock 120 until it contacts the main cooling circuit 410. After the acoustic signal reaches the main cooling circuit 410, it is conducted along the length of the main cooling circuit 410 until it reaches the acoustic emissions sensors 140 installed on the inlet 412 and outlet 414. The acoustic emission will be conducted along the main cooling circuit 410 at a constant velocity, which will be dependent on the elastic wave speed of the main cooling circuit 410 material. When the acoustic signal reaches the acoustic emission sensor 140 at the inlet 412, the time of arrival will be recorded. Similarly, when the acoustic signal reaches the acoustic emission sensor 140 at the outlet 414 the arrival time will be recorded. Based on the difference in arrival times and the known elastic wave speed of the main cooling circuit 410 the relative position of the source location of the acoustic emission can be calculated according to the following equations:

$$X = \frac{L}{2} - \frac{L\Delta T}{2C}$$

where:

X is the relative position of the source location,

L is the distance between acoustic emission sensors 140,

V is the velocity of the acoustic emission,

ΔT is the difference in the arrival times of the acoustic emission at the acoustic emission sensors 140, and C is a measured calibration value equal to $$\frac{L}{V}.$$

Once the relative position of the source location along the main cooling circuit 410 has been determined, the relative position can be compared to the known geometry of the main cooling circuit 410 in order to express the source location relative to the tapblock 120 and the tapping channel 126. For example, a source location originally expressed as "4 meters from the inlet 410" may be mapped onto the corresponding location defined in geometry of the tapblock 120 and then expressed as "left wall of the tapping channel 126" or "zone 3 (530 as shown in FIG. 5)" for the purposes of indication.

Figure 5:
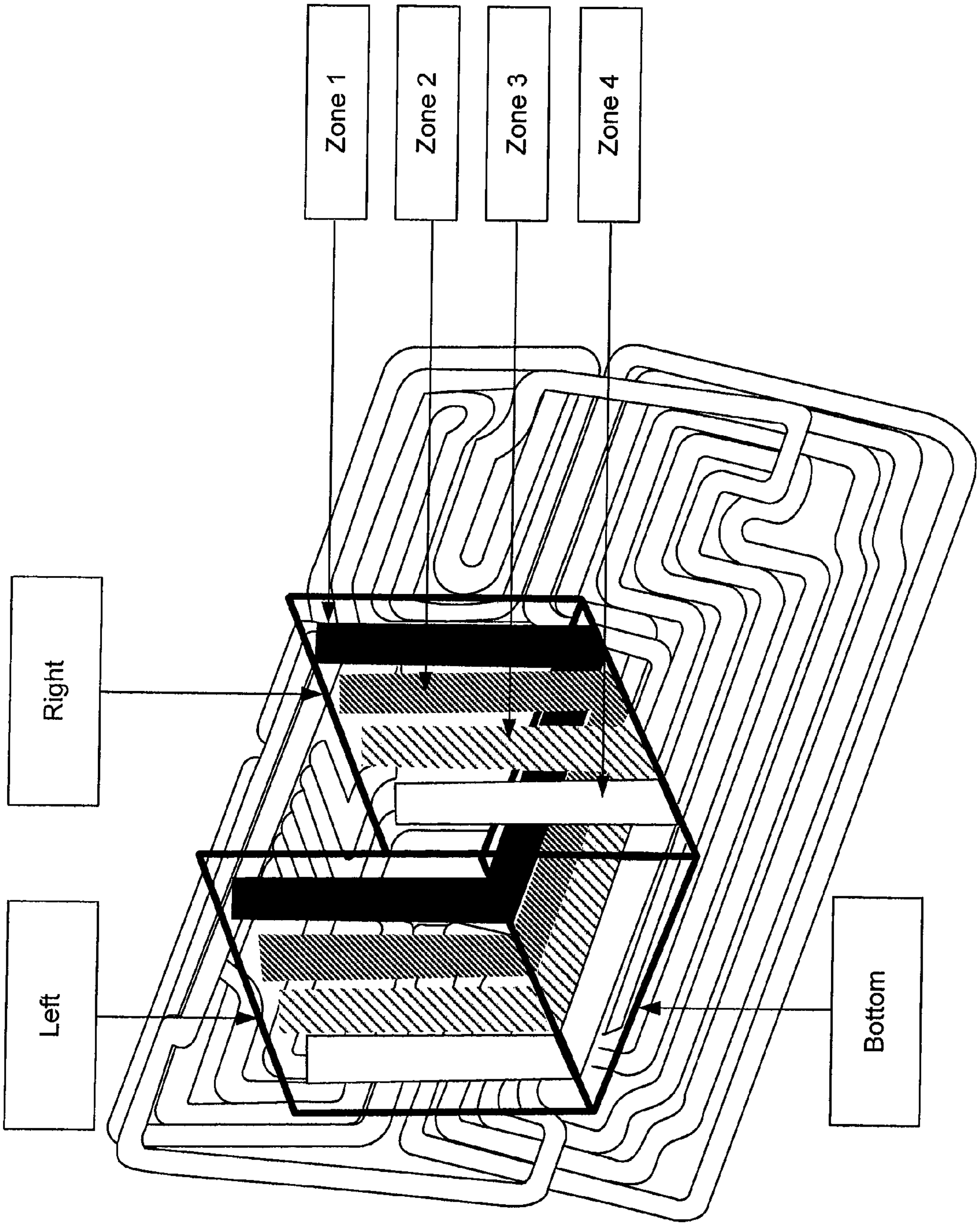
FIG. 5 is a schematic diagram showing the relative positions of pre-determined zones of the tapblock.

FIG. 5 shows pre-determined zone positions 500. As briefly described above with reference to FIG. 1, for indication and feedback purposes it may not be desirable to express the source location of an acoustic emission as "4 m from the main cooling circuit inlet", particularly when the main cooling circuit 410 follows a looping and twisting path. It may not be obvious to a tapper or to a system operator precisely which portion of the tapblock corresponds to a position 4 m along the length of the main cooling circuit 410. However, merely indicating that a hit occurred or that the hit was on the left side of the tapping channel 126 may not provide sufficient detail. Using pre-determined zone positions, the acoustic monitoring system 100 can provide meaningful feedback of sufficient detail to be used for tapper evaluation and ongoing tapblock 120 condition monitoring.

As shown in FIG. 5, the pre-determined zone positions 500 may comprise four discrete zones, zone 1, zone 2, zone 3 and zone 4. In the embodiment of the zone positions 500 shown, the numbering of the zones begins at the hot face 122 of the tapblock 120, with each zone being assigned a higher number the further it is from the hot face 122. In addition, each zone may contain sub-divisions, such as the "left", "right", and "bottom" indications on FIG. 5. In this case, left, right and bottom refer to locations on the inner surface of the tapping channel 126. Each pre-determined zone position 500 can be mapped onto a set of waveguide 130 distances. For example, a waveguide 130 distance calculated as 4 meters from the main cooling circuit 410 inlet 412 may correspond to a tapblock 120 location of "Zone 2, Left". Using such correspondence values the source location module 320 can translate waveguide 130 position data into tapblock 120 position data which can then be output to the indicator 160. After translation and output, a lance impact occurring 4 meters along the waveguide 130 from the inlet 410 may cause a yellow warning light to come on in the portion of the indicator that corresponds to Zone 2, Left. Upon seeing the yellow light on the indicator 160, a tapper could properly re-adjust her lancing position to avoid subsequent impacts.

While each zone is shown having 3 sub-divisions, the zones may also be configured to have more or fewer subdivisions. The zone sub-divisions may also include the top of the tapping channel. The precise number and design of the zones and zone sub-divisions can be configured by a system operator based on the tapblock 120 design, the shape of the acoustic waveguide 130, the lay out of the cooling circuits 410 and 420, the sensitivity of the acoustic emissions sensors 140, the desired level of indication precision, monitoring station resources and other factors.

Although the monitoring station 150, main workstation 230 and its memory 260 are described as comprising software modules, some or all of the functions of the software modules may be executed in hardware.

Figure 6:
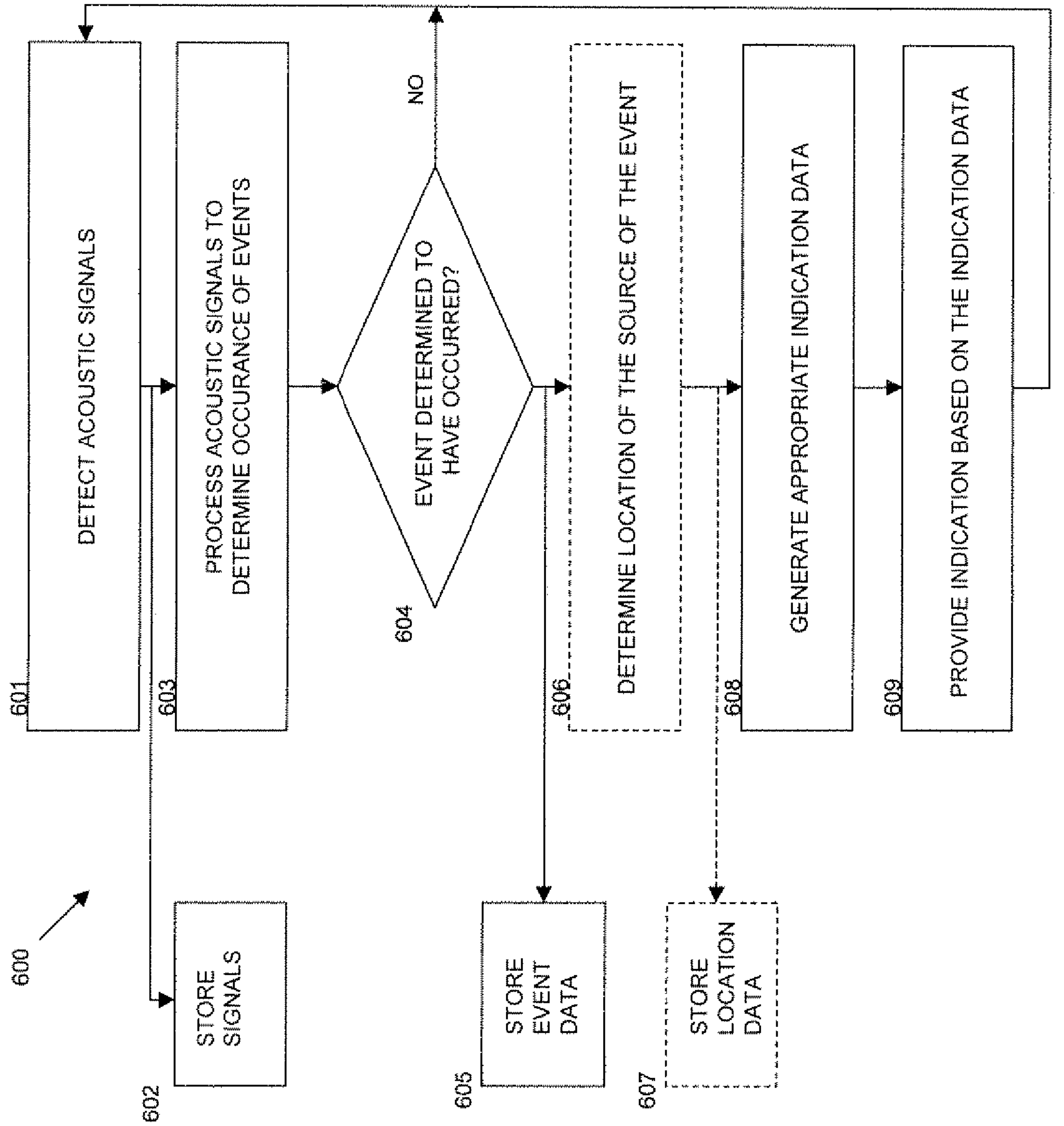
FIG. 6 is a flowchart of a method of monitoring the tapblock using the acoustic monitoring system of FIG. 1.

FIG. 6 is a flow chart illustrating a method 600 of monitoring a tapblock 120 using an acoustic monitoring system 100, as described in FIGS. 1 through 5, by detecting an acoustic event and providing an indication based on the occurrence of the event.

Method 600 begins at step 601 with the detection of acoustic signals. The acoustic signals could be any of the acoustic emissions described above. In acoustic monitoring system 100, the acoustic signals are the acoustic emissions traveling along the waveguide 130 and the acoustic signals are detected using the acoustic emission sensors 140. If acoustic signals are detected, the acoustic signal information is stored in step 602, for trending and analysis purposes. While the acoustic signals are being stored in step 602, the signals may also be processed in step 603. In step 603, the acoustic signals are processed in order to determine if an acoustic event has occurred.

At query 604, if an acoustic event has not occurred the acoustic mentoring system 100 simply continues to monitor the tapblock 120 and method 600 returns to step 601. If, however, at query 604 an acoustic event is determined to have occurred, method 600 advances to step 605 where the acoustic event data is stored for trending and analysis purposes.

Depending on the nature of the acoustic event, method 600 may proceed to step 606 in which the source location of the acoustic event is determined. If the source location of the acoustic event is determined in step 606, the source location data may be stored in step 607. However, if the nature of the acoustic event is such that specific source location data is not desired, or cannot be calculated, method 600 can proceed to step 608 in which the monitoring station 150 generates the appropriate indication data that corresponds to the acoustic event detected.

Once the indication data has been generated, in step 609 the data is output to the indicator 160. After providing the appropriate indication in step 609, method 600 returns to step 601 in order to continue monitoring the condition of the tapblock 120.

Figure 7:
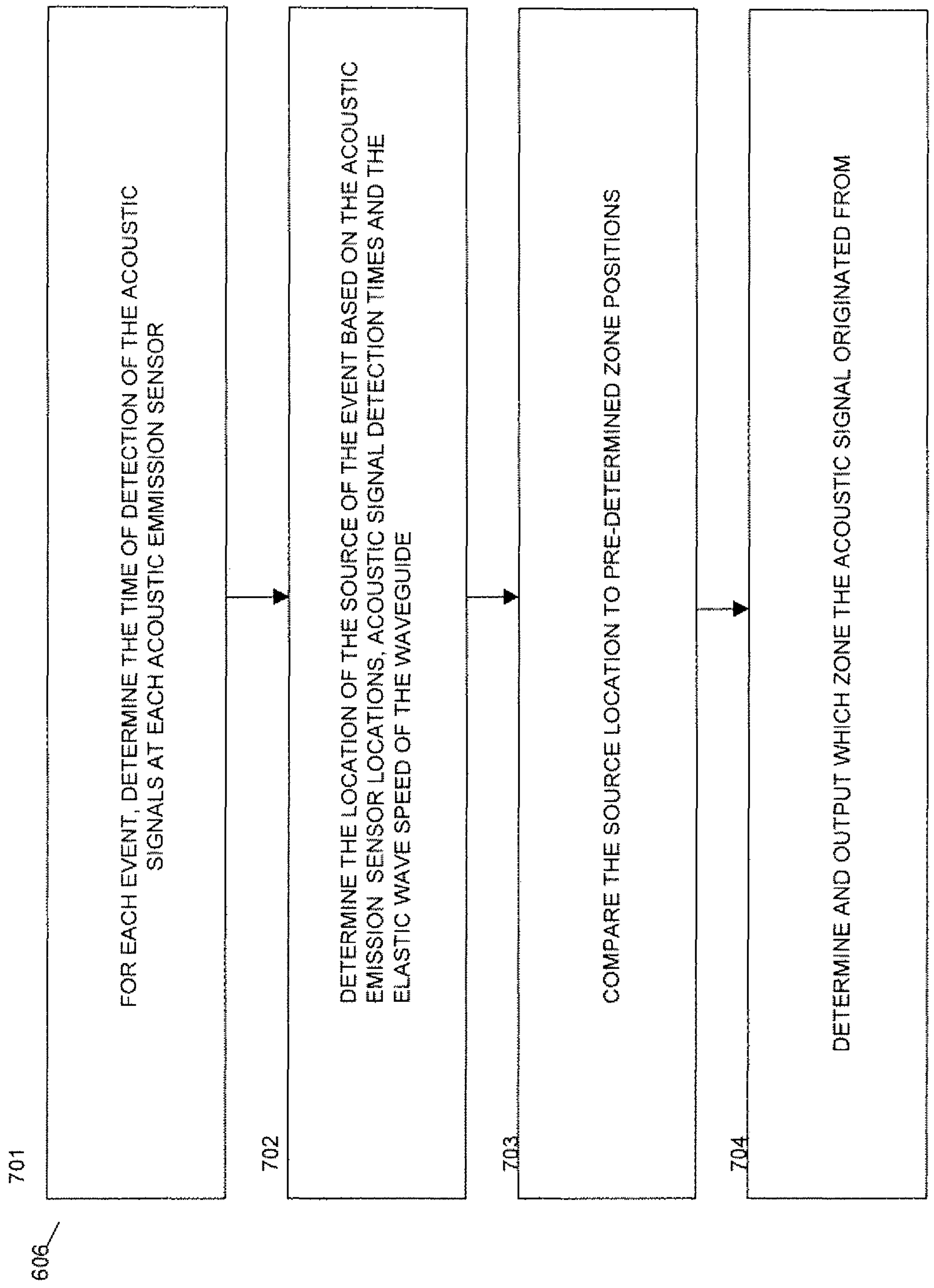
FIG. 7 is a flow chart of a method of determining the source location of an acoustic event.

FIG. 7 is a flowchart illustrating method 606, which is an example of a method for determining the source location of an acoustic event. Method 606 is an embodiment of a method for performing step 606 of method 600, described above.

Method 606 begins at step 701 in which the source location module 320 queries each acoustic emission sensor 140 installed on the acoustic waveguide 130 in order to determine the time of detection of the acoustic event at each acoustic emission sensor 140 location. Once the time of detection has been determined for each acoustic emission sensor 140, method 606 proceeds to step 702.

In step 702, the source location module 320 determines the source location of the acoustic event based on the position of the acoustic emission sensors 140, the elastic wave speed of the acoustic waveguide 130 and the time of detection of the acoustic event at each acoustic emission sensor 140 location from step 701. An example a source location calculation is described above with reference to FIG. 3.

In step 703, the source location determined in step 702 is compared with the pre-determined zone positions 500. The comparison of step 703 can be conducted by the source location module 320, the processor 250 or any other suitable component of the acoustic monitoring system 100.

In step 704, the output of the comparison of step 703 is used to determine which zone position, of the pre-determined zone positions 500, contains the source location of the acoustic event. When the zone position has been determined, step 704 outputs the source location data to steps 607 and 608 of method 600 as shown in FIG. 6.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A system for monitoring a tapblock, comprising:

a plurality of acoustic emission sensors positioned to sense acoustic signals transmitted along at least one acoustic waveguide that is at least partly received within an outer structure of the tapblock and generate corresponding acoustic signal data;

a data processing system for processing the acoustic signal data from each of the acoustic emission sensors to determine the occurrences of events in relation to an inner structure of the tapblock, the data processing system having a memory and being configured to compare the acoustic signal data with pre-determined conditions of the tapblock and to generate indication data based on the comparison of the acoustic signal data with the predetermined conditions;

indication apparatus responsive to the data processing system for providing an indication based on the indication data.

2. The system of claim 1, wherein the indication comprises at least one of an audio indication and a visual indication.

3. The system of claim 1, wherein the indication apparatus is arranged to provide the indication in a vicinity of the tapblock.

4. The system of claim 3, wherein the indication apparatus comprises at least one indicator device in the vicinity of the tapblock to indicate a relative location of one or more of the determined events within the inner structure.

5. The system of claim 4, wherein the indication of the relative location comprises one of a side location indication, a bottom location indication and a top location indication.

6. The system of claim 5, wherein the indication of the relative location comprises a sector indication corresponding to one of a plurality of sectors along a length of a tapping channel of the tapblock.

7. The system of claim 6, wherein the plurality of sectors comprises two, three or four sectors.

8. The system of claim 1, wherein the indication apparatus comprises at least one display responsive to the data processing system to display graphical images representative of the indication.

9. The system of claim 8, wherein the at least one display is located remotely from the tapblock.

10. The system of claim 8, wherein the at least one display is responsive to the data processing system to display a relative location of one or more of the determined events within the inner structure.

11. The system of claim 1, wherein the indication comprises a real-time warning indication when one or more of the determined events is determined by the data processing system to exceed an event limit.

12. The system of claim 1, wherein the pre-determined condition comprises any one of: an impact; a predetermined number of impacts; a predetermined number of impacts in a particular area of the inner structure; an impact in an area of the inner structure designated as a sensitive area; a predetermined number of impacts in an area of the inner structure designated as a sensitive area; a scrape; a predetermined number of scrapes; a predetermined number of scrapes in a particular area of the inner structure; a scrape in an area of the inner structure designated as a sensitive area; and a predetermined number of scrapes in an area of the inner structure designated as a sensitive area.

13. The system of claim 1 wherein the at least one acoustic waveguide comprises at least one of a cooling conduit and a thermal well.

14. The system of claim 1 wherein the plurality of acoustic emission sensors comprises a plurality of accelerometers.

15. A method of monitoring a tapblock, comprising:

receiving electrical signals from a plurality of acoustic emission sensors along at least one acoustic waveguide that is at least partly received within an outer structure of the tapblock, the electrical signals corresponding to acoustic signals transmitted along the at least one acoustic waveguide and sensed by the acoustic emission sensors;

processing the electrical signals to determine the occurrences of events in relation to an inner structure of the tapblock by comparing the electrical signals with pre-determined conditions of the tapblock;

generating indication data, depending on the comparing; and providing an indication based on the indication data.

16. The method of claim 15 wherein the plurality of acoustic emission sensors are located at substantially opposite ends of the at least one acoustic waveguide.

17. The method of claim 15 wherein the at least one acoustic waveguide comprises a cooling circuit received within the tapblock.

18. The method of claim 15 wherein the occurrence of an event is determined by the use of at least one of a magnitude threshold and an occurrence threshold.

19. The method of claim 15 wherein the indication comprises at least one of an audio indication and a visual indication.

20. The method of claim 15 wherein the visual indication includes displaying a first, second or third state representative of at least one of the relative condition of the tapblock and the significance of a given event.

21. The method of any claim 15 wherein the indication includes a display that indicates the location of the source of the event.

22. The method of claim 15 wherein the plurality of acoustic emission sensors comprise accelerometers.

23. A system for monitoring a tapblock, comprising:

a plurality of acoustic emission sensors positioned to sense acoustic signals transmitted along at least one acoustic waveguide that is at least partly received within an outer structure of the tapblock and generate corresponding acoustic signal data; and a data processing system for processing the acoustic signal data to determine the occurrences of events in relation to an inner structure of the tapblock, the data processing system having a memory for configuring a processor to compare the acoustic signal data with pre-determined conditions of the tapblock and to generate output data depending on the comparison of the acoustic signal data with the pre-determined conditions.

24. The system of claim 23 wherein the at least one acoustic waveguide comprises a thermal well.

25. The system of claim 23 wherein the at least one acoustic waveguide comprises at least one of a primary cooling circuit and a secondary cooling circuit.

26. The system of claim 23 wherein the plurality of acoustic emissions sensors comprise a plurality of accelerometers.

27. The system of claim 23 wherein the memory comprises an acoustic tomography module configured to produce images based on the acoustic emissions.

28. The system of claim 26 wherein the memory further comprises a pattern recognition module configured to identify the source location of a given acoustic emission.

29. The system of claim 26 wherein the memory further comprises an acoustic emission data acquisition and evaluation system.

30. The system of claim 29 wherein the acoustic emission data acquisition and evaluation system further comprises a detection module, a source location module and a signal processing module.

31. The system of claim 26 wherein the data processing system further comprises a display.

32. The system of claim 26 wherein the data processing system is communicably connected to a network such that the data processing system can be accessed and controlled from at least one user station.

33. The system of claim 31 wherein the at least one user station is geographically remote from the tapblock.

34. The system of claim 26 further comprising a status display configured to display the output data.

35. The system of claim 26 wherein the output data comprises indication data that is displayed by an indicator.

* * * * *